Jan. 30, 1968            G. NELSON            3,366,403
LATCH MEANS FOR PULL TYPE PIPE COUPLINGS
Filed Oct. 23, 1965            2 Sheets-Sheet 1
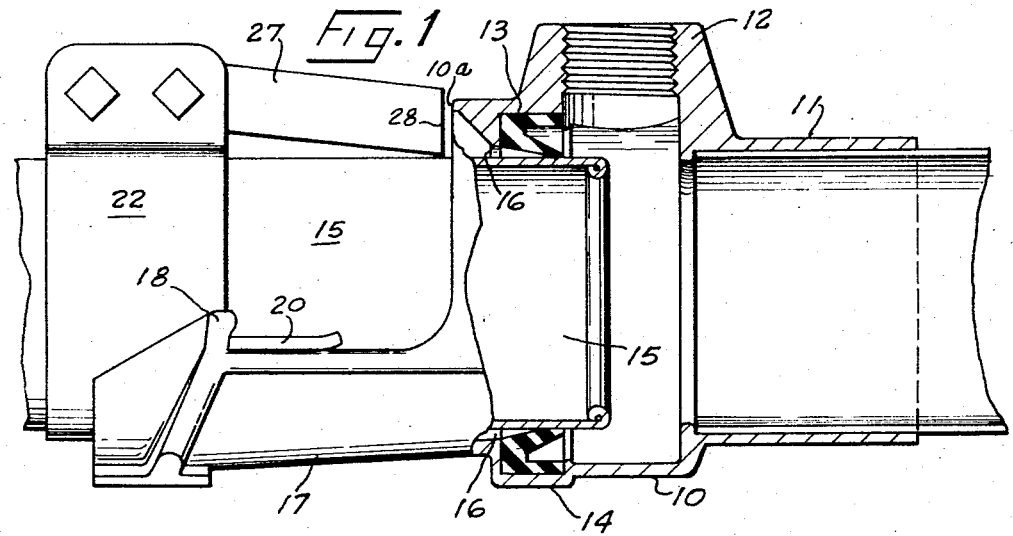
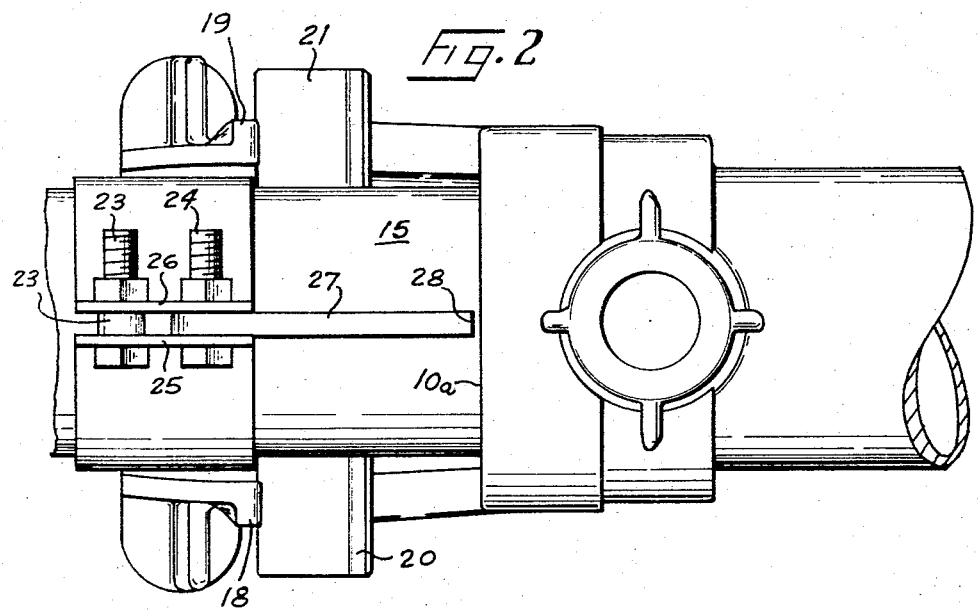
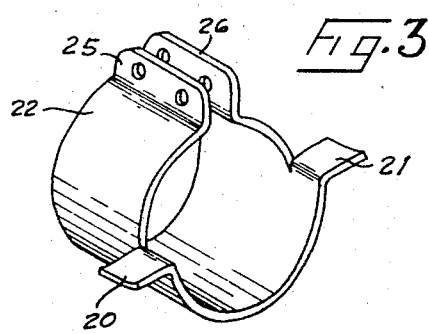
INVENTOR.
GEORGE NELSON
BY *Wells & H. John*
ATTYS.

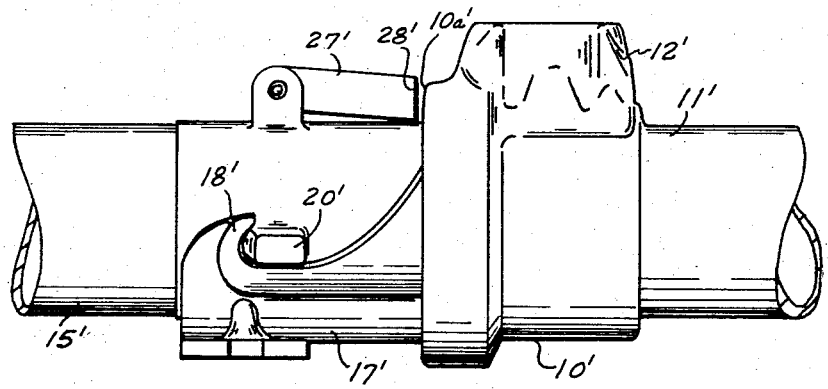
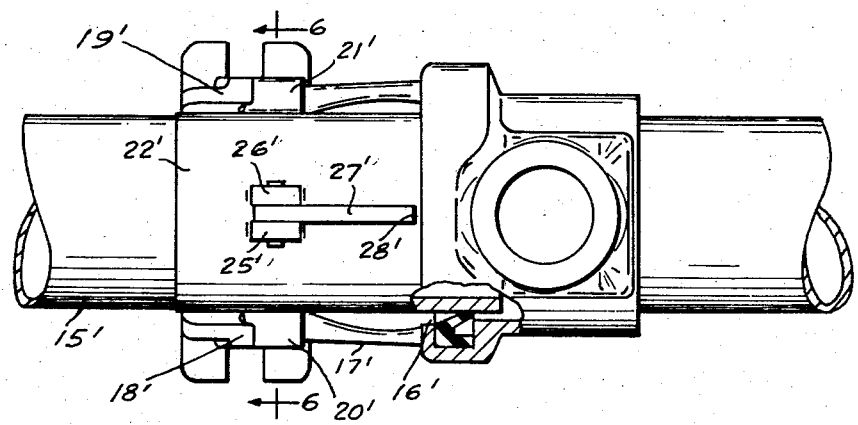
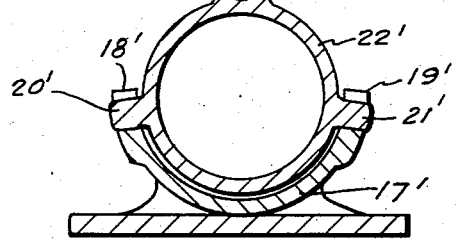
INVENTOR.
GEORGE NELSON
BY Wells & H. John
ATTYS.

United States Patent Office 3,366,403
Patented Jan. 30, 1968

3,366,403
LATCH MEANS FOR PULL TYPE PIPE COUPLINGS
George Nelson, Spokane, Wash., assignor to Anderson-Miller Mfg. Co., Spokane, Wash., a corporation of Washington
Filed Oct. 23, 1965, Ser. No. 503,928
4 Claims. (Cl. 285—6)

ABSTRACT OF THE DISCLOSURE

The disclosure describes a pull type coupler for irrigation pipe having a tubular coupler unit 10 with a shoe 17 extending outwardly from the opening thereof. The shoe 17 has upstanding hooks 18 and 19 formed therein spaced from the coupler unit and facing the coupler unit 10 for receiving lugs 21 formed on a tubular member 22 affixed to the second pipe section. A latch pin is mounted on the tubular member and extends toward the coupler unit 10 a distance less than the movement necessary between the hooks and lugs endwise of the pipe sections to release the lugs from the hooks. To release the coupler units the latch pin 27 is pivoted upwardly to clear the end faces of the coupler unit 10.

---

The present invention relates to a pull type coupler for irrigation pipe. These couplers as now manufactured include a short section of pipe with a coupler head provided with a sealing device within the head to receive the end of the other piece of pipe and permit some rocking movement of the second pipe within the head. The head itself has a shoe portion extending from it to form a cradle to receive the second pipe. This cradle has hooks upstanding on the sides to receive lugs on the second pipe. The hooks and lugs cooperate to enable the head to pull the second section of pipe and provide sufficient flexibility for uneven ground. It has been found however in practice that often the lugs will be forced out of the hooks when the pipes sag at the coupler.

It is the purpose of the present invention to provide a simple latch combination with the lugs and hooks to prevent accidental disconnection of the lugs from the hooks which will also retain flexibility of the coupling.

The nature and advantages of my invention will appear more fully from the following description and the accompanying drawings illustrating the invention. The drawings and description are intended however to be illustrative only and are not intended to limit the invention except insofar as it is limited by the claims.

In the drawings:

FIGURE 1 is a side view partly in section of a pipe coupling embodying my invention;

FIGURE 2 is a plan view of the coupling;

FIGURE 3 is a small perspective view of one part of the coupling;

FIGURE 4 is a side view of a modified coupling;

FIGURE 5 is a plan view of the coupling shown in FIGURE 4 with certain parts being broken away; and FIGURE 6 is a sectional view taken on the line 6—6 of FIGURE 5.

Referring now in particular to FIGURES 1, 2, and 3, a coupler head 10 is shown with a section of pipe 11 integral therewith to receive a length of pipe. The head 10 has a threaded nipple 12 to receive a stand pipe for a sprinkler head. The head has a seat 13 for a resilient seal ring 14 of known construction. The seal ring 14 is adapted to receive a length of pipe 15 and prevent water leakage along the exterior of the pipe 15. It will be noted that the pipe 15 is somewhat smaller than the annular opening 16 in the end of the head 10 that receives it so that there is a limited amount of movement of the pipe 15 within the head 10 in a direction transverse to the axis of the pipe 15.

The head 10 has a shoe 17 extending from it and forming a cradle to receive the pipe 15. The shoe has upstanding hook portions 18 and 19 which are adapted to receive lugs 20 and 21 that are carried by the pipe section 15. In the present instance the lugs 20 and 21 are formed on a split sleeve 22 which is clamped on the pipe 15 by a pair of bolts 23 and 24 through flanges 25 and 26 on sleeve 22. The bolt 24 also pivots a latch bar 27 to the member 22. This bar is of substantial width up and down so that its end 28 extends up beyond the end face 10A of the coupler 10 when the bar rests on the pipe section 15.

The relation of the latch bar 27 to the lugs 20 and 21 is such that when the lugs 20 and 21 are seated against the hooks 18 and 19 the bar 27 does not reach to the adjacent end face 10A of the head 10. When the pipe sections 11 and 15 are axially in line, the bar 27 is short enough to enable the pipe 15 to rock upward relative to the head 10 slightly but not enough to enable the lugs 20 and 21 to clear the hooks 18 and 19. This relation provides the desired limited flexibility in the coupling. It does not however prevent the lugs 20 and 21 from being lifted clear of the hooks 18 and 19. The pipe section 15 is removed by first lifting the bar 27, then swinging the section 15 up so the lugs clear the hooks, then pulling the pipe 15 and the coupler 10 apart.

In the form of the invention shown in FIGURES 4, 5, and 6 the essential features of the invention remain the same and the corresponding parts have been similarly labelled. The distinction of this second form from the first form described lies in the fact that the pipe 15' has its lug carrying member 22' integral with it instead of having the split sleeve of the first form. The portion 22' carries upstanding ears 25' and 26' to pivot the latch finger 27'.

It is believed that the nature and advantages of my invention will be clear to those skilled in this art. Having thus described my invention, I claim:

1. In a pull type coupler for irrigation pipes wherein a tubular coupler unit secured to one pipe section has an open end with a seal therein slidably and loosely receiving the end of a second pipe section, said coupler unit having a shoe extending therefrom to guide the second pipe section into the seal, the combination with said coupler and second pipe section comprising:
   (a) diametrically opposed upstanding hooks on said shoe spaced from the end of the coupler, said hooks having curved ends thereof that are turned back and extend axially forward the coupler unit a prescribed distance and a substantially planar abutment face diametrically opposite said shoe;
   (b) a tubular member affixed to said second pipe section and having lugs thereon extending into the hooks to prevent the disconnection of the pipe sections when the pipe sections are moved axially together less than said prescribed distance; and
   (c) a latch pin pivotally mounted on said tubular member for movement from an operative position adjacent said abutment face to an inoperative position wherein the pin when in the operative position extends toward the tubular coupler unit with the free end of the pin spaced from the tubular coupler abutment face a distance less than said prescribed distance to prevent the accidental disconnection of the pipe section.

2. The device as defined in claim 1 wherein the tubular member comprises a split sleeve clamped on said second pipe section with outwardly extending protrusions defining the lugs.

3. The device as defined in claim 1 wherein the tubular member has upstanding ears formed integrally thereon for pivotally supporting the latch pin.

4. The device as defined in claim 1 wherein the latch pin when in the operative position is parallel with the pipe sections and is capable of being pivoted upwardly to the inoperative position to permit the disconnection of the pipe sections.

References Cited

UNITED STATES PATENTS

| 2,494,855 | 1/1950 | Anderson | 285—6 |
| 2,573,974 | 11/1951 | Johannesson | 285—5 |
| 2,621,061 | 12/1952 | Beymer | 285—5 |
| 2,874,979 | 2/1959 | Shohan | 285—6 |

CARL W. TOMLIN, *Primary Examiner.*

RICHARD G. BERKLEY, *Assistant Examiner.*